Sept. 1, 1959 S. A. LUNDEEN 2,902,155
AUTOMATIC WATER SOFTENING SYSTEM
Filed March 25, 1955 2 Sheets-Sheet 2
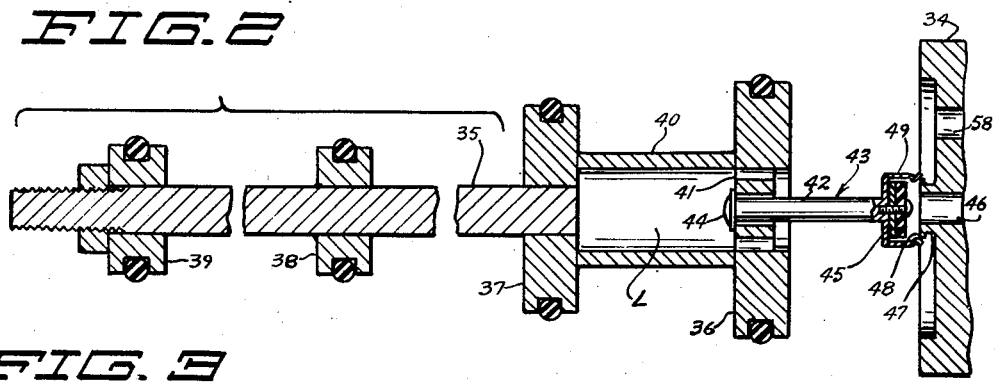
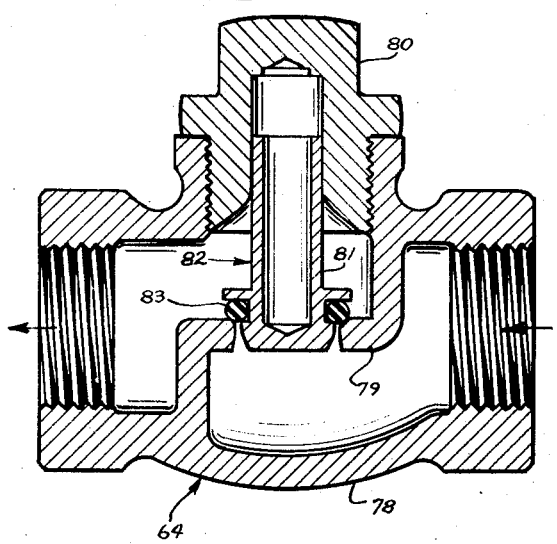
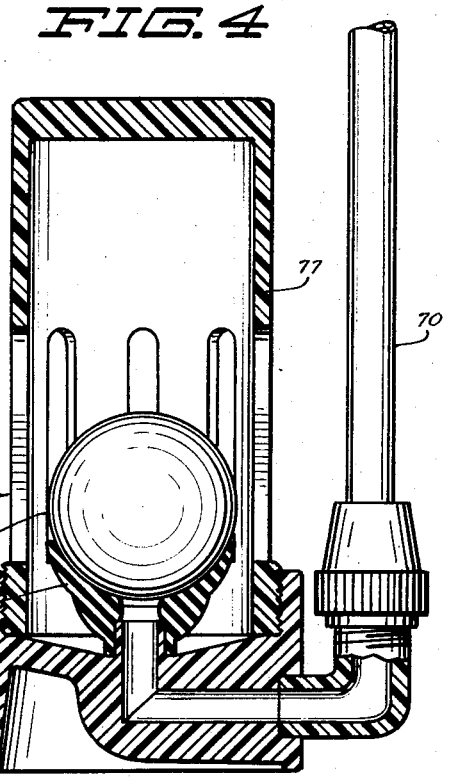
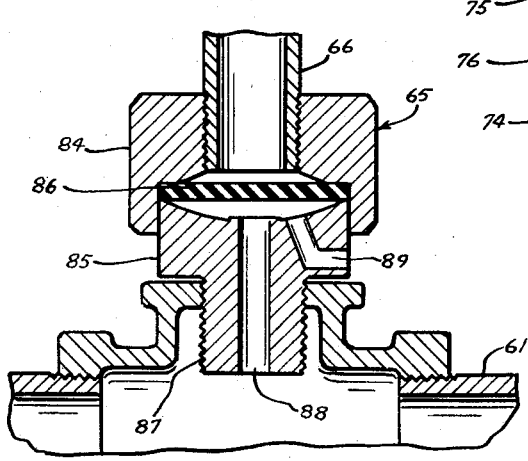
INVENTOR.
STANLEY A. LUNDEEN
BY
ATTORNEYS

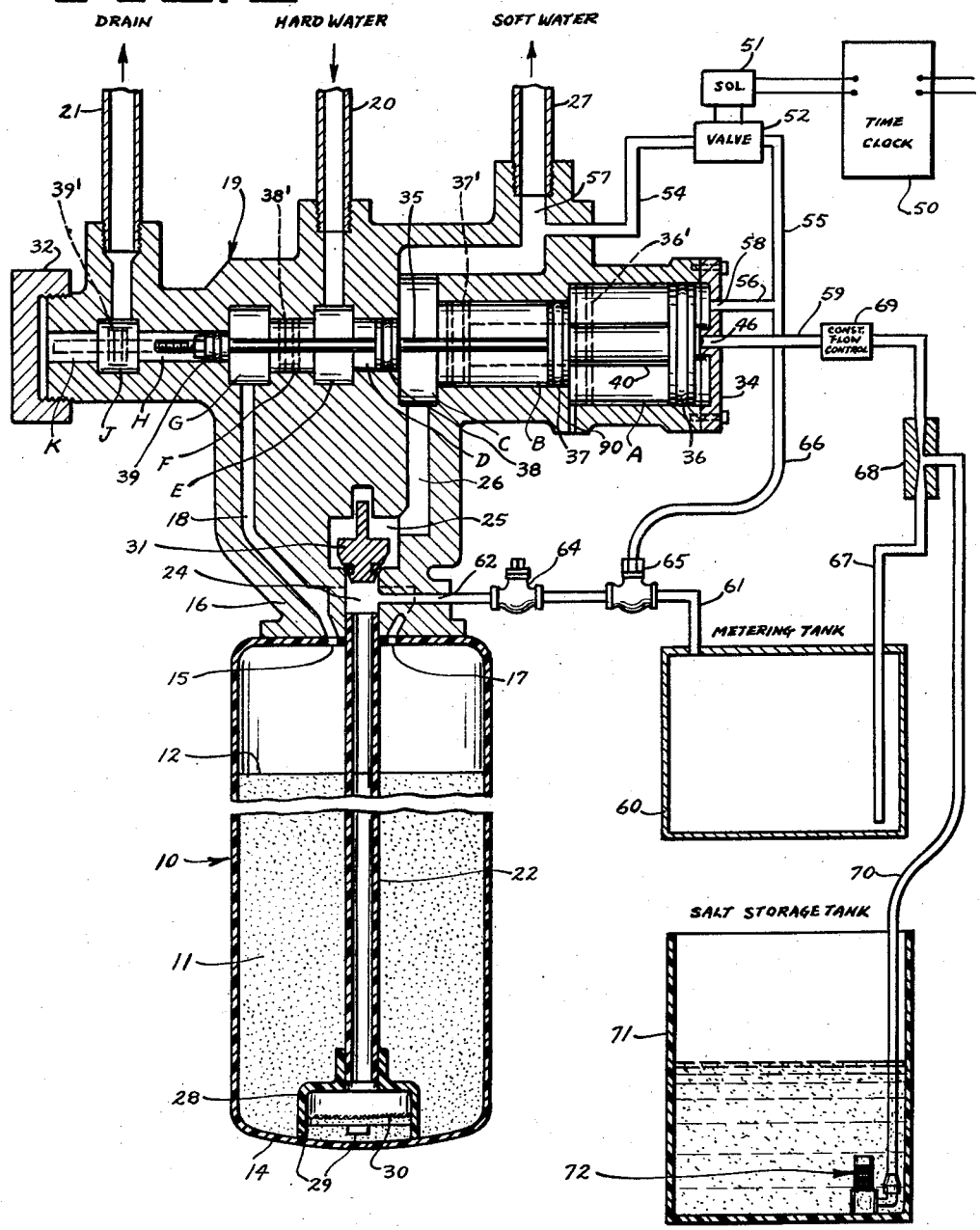

2,902,155
AUTOMATIC WATER SOFTENING SYSTEM

Stanley A. Lundeen, Minneapolis, Minn.

Application March 25, 1955, Serial No. 496,802

6 Claims. (Cl. 210—105)

This invention relates to a new and improved system for softening, filtering and purifying hard water. More particularly, this invention relates to an improved water softening system of the type employing cation-exchange materials which are regenerated for further use by salt, and automatic means for regenerating the water softener material. This invention constitutes an improvement over the invention described and claimed in my copending application, Serial No. 445,645, filed July 26, 1954, and this application is a continuation-in-part thereof.

As is well known, hard water contains principally dissolved calcium and magnesium sulfates and chlorides. It is also well known to soften hard water by passing it through an ion exchange material. The most commonly used ion exchange materials are hydrated complex sodium aluminum silicates known as "zeolites." The ion exchange takes place according to the following equation:

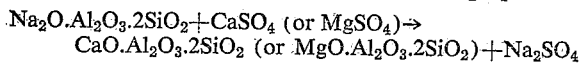

When the zeolite has been "spent" by being completely converted from the sodium to the calcium or magnesium salt, it may be regenerated for re-use by washing with a saturated brine according to the following equation:

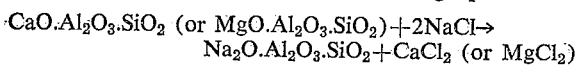

In addition to softening, the zeolite purifies the water by filtering out rust particles and the like. By the use of different exchange materials, other purification may be carried out, such as the removal of sulfur, iron and the like.

It has been the usual practice to clean and regenerate the zeolite bed in a two-step operation consisting of a hard water backwash and a salt rinse. Great difficulty has been encountered heretofore in the backwash. In order to accomplish a thorough washing, it has been necessary to agitate the zeolite with water at such a velocity, that some or much of the zeolite is washed away. This necessitated the use of fine screens in the water inlet and drain outlet to restrain the zeolite, and this restricted proper cleaning.

After the backwash, it has been customary to add salt or brine directly to the water softening tank on top of the zeolite. Besides being difficult to control, the brine concentration, this practice has tended to cause the zeolite to pack down, reducing the effectiveness of the salt rinse. In home water softening systems, regenerating the exchange material has normally required a service call from an operator providing this service periodically.

In the above mentioned copending application, there is provided an improved water softening system having an integral automatically controlled subsidiary system for backwashing and salt rinsing the water softening system, said system having means for turbulating the ion exchange softening material with air prior to the backwash and regenerating salt rinse, and means whereby a predetermined amount of air is automatically metered into the system and stored and a predetermined amount of saturated brine is automatically prepared and stored in readiness for the next regenerating cycle. In that system, maximum effectiveness of the salt rinse of the regenerating cycle is obtained by passing the brine upwardly through the ion exchange material. Dry regenerating salt may be stored, and regenerating salt solution is prepared automatically.

It is the principal object of this invention to provide an improved automatic hydraulic control valve having positive action due to an integral secondary cylinder and piston valve, and other structural refinements contributing to maximum efficiency of operation of the automatic water softening system.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is a schematic and diagrammatic representation of the improved automatic water softening system of this invention;

Figure 2 is an enlarged vertical section through the control valve piston showing details of construction;

Figure 3 is an enlarged vertical section through the check valve;

Figure 4 is an enlarged vertical section through the salt storage tank valve; and Figure 5 is an enlarged vertical section through the air bleeder valve.

Broadly considered, the improved automatic water softening system of this invention comprises: (1) an ion exchange tank, a metering chamber and a salt storage and brine forming tank; (2) pipe and valve means adapted to permit flow of hard water from a hard water main to the top of the ion exchange tank and flow of soft water from the bottom of the ion exchange tank to a soft water outlet on the softening cycle; (3) pipe and valve means adapted to permit flow of hard water from the hard water main through said metering chamber to the bottom of the ion exchange tank, forcing air from the metering chamber ahead of it, and out through the top of said tank to a drain, at the same time drawing brine from the salt storage tank, during the regenerating cycle; (4) means permitting the metering chamber to refill with air and a predetermined amount of water to be siphoned to the brine tank to prepare a fresh salt solution at the end of the regenerating cycle; and (5) automatic control means for actuating the beginnings of the water softening and regenerating cycles.

Referring now to the drawings, the water softening system of this invention comprises an elongated and upright tank 10 adapted to contain a supply 11 of a water softening ion exchange material, such as zeolite, to a level 12 at about one-half to three-fourths of the tank's capacity. Tank 10 is desirably formed of non-corrosive reinforced synthetic resinous material and is preferably provided with a rounded bottom 14. It has a central aperture 15 at its top which serves as a water inlet-outlet. Mounted on tank 10 over aperture 15 is a fitting 16 (conveniently cast integral with valve 19) having an annular port 17 communicating through channel 18 which leads to one port of valve 19. During the water softening cycle, channel 18 serves as an inlet to tank 10 for hard water from hard water inlet 20 which is connected to a hard water main and to valve 19. During the regenerating cycle, the channel 18 serves as an outlet from tank 10 for brine and flushing water to drain 21, which is likewise connected to valve 19.

Tank 10 is provided with a central tubular conduit 22 which may be a metal tube sweated into an opening 24 in fitting 16 in the center of annular inlet-outlet port 17, but which is not in communication with port 17. Alternatively, tube 22 can be of synthetic resin. An appropriate groove is then machined in opening 24 and an O-ring fitted in the groove. Tube 22 is simply pushed into opening 24 and the O-ring seals it tightly enough for all purposes of the apparatus.

Opening 24 communicates through a valve chamber 25 and channel 26 with valve 19 and through it with soft water outlet 27. The lower end of tube 22, which extends downwardly in tank 10 terminates in a bell 28 supported by feet 29 just off the surface of the bottom 14 of tank 10. Bell 28 is provided with a fine screen 30 adjacent the bottom of the tank to prevent the ion exchange material from being drawn into tube 22.

An O-ring check valve member 31 is provided in chamber 25 to permit one-way flow of soft water from tank 10 to the soft water outlet, but as will become apparent hereafter, to prevent direct flow of hard water into tube 22 during the regenerating cycle.

Valve 19 is a multi-functional multiple-port, two-position spool and sleeve valve comprising a cast body having a plurality of coaxial cylindrical chambers of varying diameters designated by the letters A, B, C, D, E, F, G, H, J and K. Of these, A, B, D, F and H act as valving chambers and are machined smooth. The chamber area is closed at one end by a cap 32 screwed onto the threaded body and at the other end by a plate 34 having two ports therein. Extending axially through the chambers in valve 19 is a rod or spindle 35 by which there are supported four pistons 36, 37, 38 and 39 respectively. Each of the first three succeeding pistons 36, 37 and 38 has a smaller area than its predecessor. Each piston is preferably in the form of a flat cylinder or disk having a loose sliding fit in its respective cylindrical chamber and having an annular groove around the periphery into which a ring of suitable packing such as an O-ring may be inserted to provide a tight sliding fit with the smooth chamber walls.

As best shown in Figure 2, there is a tubular member 40 interposed between pistons 36 and 37. The interior of this tubular member forms a chamber L which is in direct fluid communication through ports 41 with that portion of chamber A which lies between the piston 36 and end plate 34. Chamber L serves primarily to receive the shaft 42 of a secondary valve member 43. Shaft 42 slides freely longitudinally in a central aperture in piston 36. The movement of valve 43 relative to piston 36 is restricted in one direction by head 44 within chamber L and in the other direction by a resilient valving disk member 45 which seats in outlet port 46 in end plate 34. End plate 34 is provided with an interior nipple 47 surrounding port 46. Nipple 47 in turn has an outwardly extending annular lip or shoulder 48 at its inner end. A spring clip 49 on valve 43 is adapted to engage the lip 48 on nipple 47 for a purpose to be explained in detail hereinafter. Alternatively, the clip means or other equivalent retaining means may be on the nipple adapted to grasp the valve disk 45.

Valve 19 is actuated because of the differential in hydraulic pressure exerted upon the pistons, due to the difference in areas of the pistons. Piston rod 35, tube 40 and pistons 36, 37, 38 and 39 are moved to the positions 36', 37', 38' and 39' indicated by broken lines when fluid pressure is allowed to build up in the endmost chamber A behind piston 36. This occurs when electrically operated time clock 50 actuates solenoid 51 opening the valve 52 in the by-pass line 54—56 from chamber 57 adjacent the soft water outlet 27 through the port 58 in end plate 34 to chamber A of valve 19.

During the water softening cycle, valve 52 is closed and the pistons are in the positions shown in solid lines. With the pistons in these positions, the cylindrical chambers of valve 19 are divided into five parts which function as follows:

(1) The thin space in chamber A between piston 36 and end plate 34 is non-functional during the water softening cycle.

(2) The space between pistons 36 and 37 is likewise non-functional during the softening cycle.

(3) The space between pistons 37 and 38 includes chamber B and chamber C which communicates both with channel 26 from the water softening tank and channel 57 to the soft water outlet. Pistons 37 and 38 are operative during the water softening cycle to channel the soft water out through the soft water outlet to the service line. The valve is held in softening position due to the main pressure exerted against piston 37.

(4) The space between pistons 38 and 39 include part of chambers D, E, F and G. Chamber E communicates with the hard water inlet 20, chamber G communicates with inlet channel 18 to the water softening tank and chamber F connects chambers E and G. Thus, during the water softening cycle, pistons 38 and 39 are operative to direct the hard water into the top of the water softener tank.

(5) The space between piston 39 and the end cap 32, including chambers H, J and K communicates only with the drain outlet 21 and is non-functioning during the softening cycle.

During the regenerating cycle, the valve 52 is open and the pistons are in the positions indicated by the broken lines. With the pistons in these positions, the cylindrical chambers of valve 19 are divided into only four parts which function as follows:

(1) The pressure induced in chamber A between the piston at position 36' and end plate 34 by the flow of hard water from by-pass line 54—56 moves the piston rod and pistons of the valve to the regenerating position and holds them there.

(2) Pistons at positions 36' and 37' enclose a portion of chamber B which does not communicate with any of the rest of the system and hence is non-functional during the regenerating cycle.

(3) The space between pistons at positions 37' and 38' include chamber C which is in communication with both channel 26 from the water softening tank and channel 57 to the soft water outlet, chamber E which communicates with hard water inlet 20 and chamber D which connects chambers C and E. Thus, during the regenerating cycle, hard water from the inlet 20 flows into chamber E, through chamber D and into chamber C. From here, it is prevented from passing through channel 26 into tube 22 and thus directly into the water softening tank, by check valve 31. The soft water taps on the service lines fed by outlet 27 will normally be closed during the regenerating cycle, preventing flow of hard water out through this outlet. Accordingly, the flow of hard water is directed by pistons at positions 37' and 38' out through channel 57 into by-pass line 54—56 to the pressure chamber A, and thence, as will be explained in detail hereafter, to the metering tank and the water softening tank.

(4) During regeneration, the piston at position 39' hangs free in chamber J and performs no valving function. Thus, the chambers in the space between piston 38' and cap 32 at the end of the valve are in communication. Chamber G communicates with inlet-outlet channel 18 from the water softener tank and chamber J communicates with drain outlet 21 permitting escape to the sewer of air, brine and flushing water forced up through the softener tank during the regeneration cycle.

The automatic water softener system of this invention also comprises a closed vessel 60 of predetermined volume which serves as a metering tank for measuring out the water to form the regenerating salt solution and as an air pressure generating and storage chamber for the flushing air which is forced up through the ion-exchange material prior to the backwashing. The top of metering tank 60 is connected by means of line 61 to a channel 62 in fitting 16 which is in communication with opening 24 and tubular conduit 22. A check valve 64 in the line 61 prevents flow of soft water into the air storage chamber during the water softening cycle. An air bleeder valve 65 in line 61 between check valve 64 and the top of tank 60 permits air to be drawn into tank 60 for storage at the end of the regenerating cycle. Bleeder 65 operates by fluid pressure in line 66, an extension of by-pass line 54—55 which is controlled by solenoid 51.

Metering tank 60 is connected to by-pass line 59 and valve 19 through a line 67 which extends to the bottom of tank 60 and is connected to a venturi-type aspirator or injector 68 which is in turn connected through a constant flow control 69 to the line 59. When water flows through the venturi 68, brine is drawn through line 70 from the bottom of salt storage tank 71 and introduced into softening tank 10 through metering tank 60 and tube 22. Salt storage tank 71 is open to the atmosphere and is disposed lower than metering tank 60. The salt storage tank preferably has a capacity considerably in excess of that of metering tank 60, so as to permit storage of excess rock or nugget salt.

The valve 72 is preferably held in a clip at the bottom of the salt storage tank. The base 74 of the valve is connected to line 70 which passes up inside of tank 71, eliminating the need for a tank bottom fitting. The valve comprises a ball float 75 adapted to rest in the resilient valve seat 76. When the tank 71 contains no liquid, ball 75 seats in resilient valve seat 76 and is held there by suction from the venturi, preventing air from being sucked into the system. On the other hand, when the lower portion of tank 71 contains brine, the ball 75 floats free from the resilient valve seat 76 and thus keeps the valve open. Ball 75 is retained by means of a perforated cage 77 around the valve. Cage 77 preferably is provided with a screen over the perforations which serves to hold back the excess stored salt. All parts of valve 72 and line 70 are preferably formed of synthetic resinous material to eliminate corrosion, due to the action of the brine. Likewise, tank 71 is preferably formed from reinforced synthetic resin.

Check valve 64 is shown in detail in vertical section in Figure 3. The check valve comprises a cast metal body with connections for insertion of the valve in line 61. Cast integrally with the body shell 78 and dividing the body into two chambers of about equal size is a barrier wall 79 having a vertical portion extending down from the top of the valve at one side thereof, a generally horizontal wall portion centrally disposed in the shell and a portion extending vertically downward at the opposite side of the valve body. Centrally located in the horizontal wall portion is an aperture beveled around its upper peripheral edge to form a valve seat. The chamber below the dividing wall forms an inlet chamber and that above is an outlet chamber.

Communicating with the upper chamber centrally above the aperture in the barrier wall 79 is a threaded opening into which a threaded cap 80 is screwed. Cap 80 is provided with a central guide channel closed at one end and flared at the other to receive the upstanding elongated stem 81 of valve disk 82. Valve disk 82 comprises a generally frusto-conical end portion having a maximum diameter just slightly smaller than the diameter of the aperture in the barrier wall 79. Spaced apart from the end portion is an annular shoulder member integral with the stem and having a diameter greater than that of the aperture. A resilient O-ring 83 is fitted into the annular channel or groove between the shoulder member and end portion. This resilient O-ring has an outside diameter greater than the aperture and seats in the valve seat when the disk is subjected to back pressure from above.

The resilient valving member 83 insures effective stoppage of return flow due to back pressure. Even though the valve disk and/or the valve seat may become corroded or gouged, due to particles in the water, the O-ring, due to its resiliency, will be pressed down into any irregularities. The intermittent squeezing and relaxation of the resilient ring discourages the deposition of corrosion products or mineral incrustation, and if such deposits do occur, it tends to loosen and slough them off.

The bleeder valve 65 is shown in detail in vertical section in Figure 5. The bleeder valve comprises two sections, a female portion 84 and a male portion 85 adapted to fit with a tight press fit in 84 and a resilient diaphragm 86 adapted to fit between them. Female portion 84 has a central channel adapted for connection to line 66. Male portion 85 is provided with a nipple 87 for connection into line 61. A central bore 88 extends through the length of the male plug member 85. The top of this plug is concave in cross section to provide flexing space for resilient diaphragm 86. A side port 89 extends through the male plug member 85 for admitting air into flow line 61 when diaphragm 86 is in relaxed position.

The water softening system of this invention is actuated by the automatic time control clock 50. This clock may be set to begin a regenerating cycle automatically at any time of the day or night and on any day or days of the month, depending upon the requirements of the system. The regenerating cycle may be of any predetermined length. During the water softening cycle, the solenoid 51 is inoperative and valve 52 remains closed. The main pressure exerted against piston 38 by the incoming hard water and against piston 37 by the outgoing soft water maintains the positions of pistons 36, 37, 38 and 39, as shown in the solid lines in Figure 1. When a soft water tap is opened anywhere in the water distribution system served by the softener, hard water flows from the main through inlet 20 into chamber E. Then, because of the position of the pistons, the hard water flows through chambers F and G into channel 18 to annular port 17, and thence into the top of softening tank 10. In tank 10, the hard water is forced down through the bed 11 of ion exchange material, and in the course of its passage through the bed, the water is filtered and softened by ion exchange. This soft water is now drawn from the bottom of tank 10 through screen 30 into bell 28 and tubular conduit 22. The soft water is prevented from backing up into metering tank 60 because of check valve 64, but it flows through valve chamber 25 past valve member 31 into channel 26, and then into chambers B and C, out through channel 57 to the soft water outlet 27. Because valve 52 is closed, no soft water flows out through line 54.

Because the ion exchange material in time exchanges all its soft water ions for the hard water ions which it accepts, it becomes spent and must be regenerated periodically. This frequency of regeneration is determined by such factors as the exchange capacity of the softener material, the volumetric capacity of the softener tank, the degree of hardness of the water and the average soft water consumption by the user. The necessary frequency of regeneration can readily be calculated. It is customary to provide a wide margin as a safety factor and regenerate the ion exchange material well in advance of its theoretical exhaustion. This time is then set on automatic control clock 50. Because during the regeneration cycle hard water will be available at the soft water taps, it is preferred that the clock be set for regeneration to take place at a period of low water consumption, such as between midnight and 6 a.m.

At the beginning of the regenerating cycle, the automatic control clock 50 actuates solenoid 51 at the predetermined time. Solenoid 51 opens valve 52, permitting soft water to flow through by-pass line 54—56 into the chamber A between piston 36 and valve end plate 34. The greater pressure on piston 36, due to its greater area, then forces piston 36, and accordingly tube 40, rod 35 and pistons 37, 38 and 39, forward into chamber A to the positions indicated by broken lines at 36′, 37′, 38′ and 39′. A bleeder port 90 permits escape of entrapped air before piston 36.

To insure that the plunger carrying all of the pistons is forced all the way over to regenerating position, flow of water through and out of chamber A through port 46 is cut off by a secondary valve action until the pistons have been moved. As the action of hydraulic fluid flowing against piston 36 through line 56 and port 58 pushes the piston 36 away from end plate 34, spring clip 49 in engagement with the lip 48 of port nipple 47 holds resilient valving member 45 of valve 43 against port 46 effectively cutting off flow through this port. As piston 36 moves, shank 42 remains stationary, permitting the piston to slide freely around it. The length of shank 42 is slightly less than the length of the piston stroke, so that just before the piston 36 reaches the end of its stroke and its regenerating position, head 44 of valve shank 42 is engaged by the piston 36 and the valve 43 is pulled away from port 46, then permitting flow out through this port. In this way, it is assured that pistons 36, 37, 38 and 39 are in their regenerating positions and drain 21 is open before any water is permitted to flow through the system in regeneration. By this means, possible backing up of water through the venturi to the salt storage tank, causing it to overflow because of failure of the port to drain 21 to open, is avoided.

With the valve pistons now in their new positions, hard water from the main flows through inlet 20 into chamber E. Its passage through chamber F is now cut off by the piston at position 38′, forcing it instead through chamber D into chamber C. From chamber C, check valve 31 prevents flow directly into tube 22 and the water softening tank. Thus blocked, the flow is forced out through channel 57 to the soft water outlet. Since no water from the soft water taps will normally be drawn during the regenerating cycle, the hard water is forced into line 54, through open valve 52 and lines 55 and 56 to chamber A, maintaining pressure on the piston at position 36′. The hard water from chamber A is then forced out through port 46, line 59, through uniform flow control 69, venturi aspirator 68 and line 67 into metering tank 60. A by-pass line 66 exerts pressure against resilient diaphragm 86 in bleeder valve 65 shutting off port 89 and channel 88 and preventing flow of air and then water from flow line 61.

As will be explained in detail hereafter, tank 60 is at this time filled with air and salt storage tank 71 contains a saturated salt solution equal in volume to the capacity of the metering tank. As the flow of hard water continues, it fills up tank 60, forcing the air stored in that tank out through line 61, through check valve 64 into opening 24 and tubular conduit 22. Check valve 31 prevents escape into channel 26 because of the greater pressure on that side of the line. In this connection, it will be recalled that line 20 is the original source of pressure on the system, and this (hard water) line 20 is connected over to the soft water outlet 27 by valve 19 during the softening cycle. Hence, pressure is applied in undiminished amount against the upper side of valve 31. However, the same pressure of port 57 is somewhat restricted by flow through tube 54, valve 52, lines 55 and 56, chamber A of valve 19, line 59, flow control 69, venturi 68, line 67, tank 60, line 61, valve 64 and line 62 before reaching the underside of check valve 31. Hence, valve 31 remains seated at this time, i.e. during regenerating. The air (which had been stored in tank 60) is thus forced through tube 22 to the bottom of tank 10 where it is adequately distributed by screen 30 and the rounded bottom of tank 10 before being forced up through the bed of water softening material. This passage of air up through the ion exchange material turbulates it, vigorously agitating, loosening and "fluffing" it so that the salt rinsing step which immediately follows and the fresh water flushing step will be more thorough and effective. Only air is forced into the mineral tank at this time, and it rises and passes to the drain without carrying any of the water softening material.

As the flow of hard water continues through venturi 68, the saturated salt solution is sucked up through line 70, mixed with the hard fresh water and passed through line 67 into and through metering tank 60, line 61, valve 64 and tube 22 to the bottom of the bed of ion exchange material. The salt solution passes in intimate contact upwardly through the already turbulated and "fluffed" bed of water softener crystals, regenerating them, and then flows out through aperture 15 at the top of tank 10, into annular port 17 and through channel 18 to chamber G. Chamber F is closed by the piston at position 38′, thereby forcing the air, salt solution and flushing water in succession out through chambers H and J past the piston at position 39′ to drain outlet 21 and thence to the sewer.

As soon as the brine is all drawn from the salt storage tank 71, ball 75 seats in resilient valve seat 76, thus preventing air from being drawn into the system from the salt storage tank. When the brine has been forced through the system, the hard water flow is permitted to continue for a period of time as determined by the setting of automatic clock control 50 to flush the salt solution from the system. Note that the even distribution of water (first salt, and then fresh) by the bell-fitting and screen (28, 30) against the bottom of tank 10, and the absence of corners (due to the round bottom) has the effect of thoroughly flushing out filtered turbidity engendering residues from all of tank 10. Hence, when soft water is again drawn, it will immediately be crystal clear, in contradistinction to many present day softeners.

When the regenerating cycle has been completed, clock 50 de-energizes solenoid 51, closing valve 52. The relief of pressure on the large piston at position 36′ and the main pressure of the hard water upon the piston at position 37′ forces the pistons back to their original or water softening positions.

Spring clip 49 resting on the edge of lip 48 of nipple 47 holds resilient valving member 45 off port 46 to permit the water contained in chamber A to bleed off into line 59 before the valving member 45 is pushed by piston 36 against the port and clipped into place to await the beginning of the next regenerating cycle. At the same time, pressure is relieved in line 66, permitting resilient diaphragm 86 to revert to its normal position, opening port 89 and channel 88 and permitting atmospheric air to bleed into line 61 and metering tank 60.

Upon the cessation of flow of water from chamber A through the aspirator and accessory lines to the metering tank 60, the tank is filled with water. Relief of the water pressure in this system causes the water in tank 60 to be siphoned into the lower salt storage tank 71. This water, in a predetermined amount, depending upon the capacity of the metering tank, contacts the stored salt in salt storage tank 71 and prepares the saturated salt solution to be ready for the next regenerating cycle. The siphoning action of the water from the metering tank flowing into the salt storage tank is possible because tank 60 is open to the atmosphere through valve 65. The siphoning action draws air through the bleeder valve 65 into the metering tank to be stored for the next regenerating cycle.

While the system of this invention has been described with particular reference to the use of zeolite as the water softening ion exchange material, it is to be understood that the invention is not limited to the use of any particular type of water softener material. In general, the system is adaptable for use with any of the cation exchange materials which may be regenerated with salt, whether sodium chloride or other salt. Many such ion exchange materials are commercially available under a variety of trade marks. A representative list includes "Permutit Q," a sulfonated styrene type cation exchange resin having (—SO₃H) exchange groups; "Zeo-Karb," an organic cation exchange water softener and dealkalizer, efficient for removing metal cations at low concentrations, which is a sulfonated coal having (—SO₃H), (—COOH) and (—OH) exchange groups; "Zeo-Rex," a sulfonated phenolic type cation exchange resin having (—SO₃H) and (—OH) exchange groups; "Zeo-Dur," a colloidal clay ion exchanger of processed glauconite (naturally occurring green sand); and "Decalso," a precipitated gel-type sodium aluminosilicate.

As many apparently widely differing embodiments of this invention may be made without departing from the spirit and scope thereof, it is to be understood that I do not limit myself specifically to the embodiments disclosed herein.

I claim:

1. In a water softening system which comprises a hard water inlet, a soft water outlet and a drain; a water softening tank adapted to contain a deep bed of ion exchange water softening material, a water metering and air storage tank and a salt storage tank; a multiple-port, two-position, hydraulic piston valve, conduit means connecting the ports of said valve with the hard water inlet, soft water outlet, top hard water inlet to said water softening tank, top soft water outlet from said softening tank, and said drain; a tubular conduit connecting said top soft water outlet from said water softening tank with the bottom of said tank by-pass conduit means connecting the soft water outlet through a hydraulic pressure chamber in one end of said valve to the metering tank and the top soft water outlet from the softening tank in series; means in said valve for channeling hard water from said hard water inlet through said valve to the top hard water inlet to said water softening tank during the water softening cycle when the valve is in its first position and means in said valve for channeling soft water from the bottom of the water softening tank through said valve to the soft water outlet during the water softening cycle; means in said valve for channeling water from the hard water inlet through said valve to the soft water outlet and through the hydraulic pressure chamber and the metering tank to the bottom of the water softening tank during the regenerating cycle when the valve is in its other position; an aspirator in said by-pass conduit between the valve pressure chamber and the metering tank, connected to the bottom of the salt storage tank for introducing brine into the system; means in said valve for channeling water from the top hard water inlet of said water softening tank through said valve to the drain for discharging brine and flushing water from said tank during the regenerating cycle; a check valve in the conduit means between the top soft water outlet from the softening tank and the hydraulic valve; another check valve in the conduit means between the metering tank and the top soft water outlet of the softening tank; an air bleeder valve in the conduit means between the metering tank and said second check valve; said valve channeling means comprising a plurality of coaxial constantly spaced-apart pistons, said pistons having different areas whereby the position of said pistons is changed by differential hydraulic pressure upon said pistons, the largest of said pistons movable in said hydraulic pressure chamber and automatic electrically operated solenoid valve means in said by-pass conduit for introducing water into said hydraulic pressure chamber for changing said differential pressures and piston positions for diverting the flow of water through said system to the water softening cycle and the regenerating cycle, the improvement which resides in providing a secondary valve within said hydraulic piston valve, said secondary valve comprising a valve disk adapted to seat in the outlet port to said hydraulic pressure chamber, a shaft on said disk, said shaft being freely slidable in an aperture in the largest of said valve pistons, the length of said shaft being smaller than the length of the stroke of the valve pistons between positions, retaining means on the end of said shaft opposite the valve disk and spring clip means for holding said valve disk seated in said pressure chamber outlet port during at least part of the stroke of the largest piston away from said outlet.

2. A water softening system according to claim 1 further characterized, in that said secondary valve holding means includes a spring clip adapted to hold the valve disk against the outlet port of the hydraulic valve pressure chamber during at least part of the stroke of the largest piston.

3. A water softening system according to claim 1 further characterized, in that said check valves comprise valve disks, including resilient O-rings adapted to seat in the valves.

4. A water softening system according to claim 1 further characterized, in that the air bleeder valve comprises a solid valve body, a channel formed in said body, an aperture communicating with said channel connected to the conduit means between the soft water outlet and the metering tank, a plug member having an inner concave face fit tightly into said channel, a resilient diaphragm in said channel held by said plug member and defining a flexing chamber with said plug, an apertured nipple on said plug for tapping said bleeder valve into the conduit means between the metering tank and the second check valve and a bleeder port through said plug communicating with the flexing chamber.

5. In a water softening system, a hydraulic control valve comprising a valve body, an elongated channel in said body closed at each end, said channel comprising a plurality of at least four coaxial cylindrical chambers; a plurality of openings in said valve body communicating with said channel, said openings including a drain outlet, a hard water inlet, a soft water outlet to a service line, a port to the hard water inlet of a water softening tank, a port to the soft water outlet of a water softening tank, a by-pass port, a pressure fluid inlet port and a pressure fluid outlet port, said last two ports communicating with the largest of said chambers; a check valve in the port to the soft water outlet of the water softening tank; at least four coaxial constantly spaced apart pistons in said channel, said pistons having progressively decreasing surface areas, each of said pistons having a tight sliding fit in one of said cylindrical chambers, said pistons being movable together by hydraulic pressure to occupy a softening position and a regenerating position; the largest of said pistons sliding in the largest of said chambers which is a hydraulic pressure chamber having inlet and outlet ports for fluid pressure to move said pistons; the next two pistons slidable in chambers to channel water during the softening cycle from the soft water outlet of the softening tank to the soft water outlet to the service line and to the by-pass port, and during the regenerating cycle in cooperation with the check valve to channel water from the hard water inlet to the soft water outlet to the service line and to the by-pass port; the last two of said pistons slidable in chambers to channel water during the softening cycle from the hard water inlet to the port to the hard water inlet of a water softening tank and during the regenerating cycle from the port to the hard water inlet of the water softening tank to the drain outlet; a line connecting said by-pass port and pressure fluid inlet port; a solenoid valve in said line for controlling pressure in said hydraulic pressure chamber; and a secondary valve comprising a valve disk adapted to seat in said pressure fluid outlet port, a shaft on said disk, said shaft being freely slidable in an aperture in the largest of said valve pistons, the length of said shaft being smaller than the length of the stroke of the valve pistons between positions, retaining means on the end of said shaft opposite the valve disk and means for holding said valve disk seated in said pressure fluid outlet port during at least part of the stroke of the largest pistons away from said outlet.

6. A water softening system according to claim 1 further characterized in that said salt storage tank is provided with a float valve comprising a base adapted to rest on the bottom of said salt storage tank; a channel in said base, one end of which is connected to the aspirator through a length of tubular conduit, the other end of said channel being provided with a resilient valve seat; a spherical ball float valving member adapted to seat in said resilient valve seat; and a perforated cage around said valve seat and ball float to retain said float.

References Cited in the file of this patent
UNITED STATES PATENTS

| | | |
|---|---|---|
| 2,641,281 | Phillips | June 9, 1953 |
| 2,670,328 | Webb | Feb. 23, 1954 |
| 2,704,554 | Russell et al. | Mar. 22, 1955 |